(12) United States Patent
Williams et al.

(10) Patent No.: US 7,643,275 B2
(45) Date of Patent: Jan. 5, 2010

(54) ADJUSTABLE PORTABLE COMPUTER

(75) Inventors: Mitch A. Williams, Hillsboro, OR (US); Richard P. Rangel, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/829,850

(22) Filed: Jul. 27, 2007

(65) Prior Publication Data

US 2008/0019088 A1    Jan. 24, 2008

Related U.S. Application Data

(62) Division of application No. 10/957,020, filed on Sep. 30, 2004, now Pat. No. 7,251,128.

(51) Int. Cl.
*G06F 1/16* (2006.01)
(52) U.S. Cl. .................... 361/679.05; 361/679.26; 348/836
(58) Field of Classification Search ............. 361/683; 348/836
See application file for complete search history.

(56) References Cited

U.S. PATENT DOCUMENTS

| | | | | |
|---|---|---|---|---|
| 5,255,214 A | * | 10/1993 | Ma | 361/679.06 |
| 5,347,630 A | * | 9/1994 | Ishizawa et al. | 345/538 |
| 5,960,432 A | | 9/1999 | Werner | |
| 6,010,171 A | * | 1/2000 | Margiottiello | 294/94 |
| 6,016,171 A | * | 1/2000 | Tsao | 348/836 |
| 6,035,214 A | | 3/2000 | Henderson | |
| 6,141,023 A | | 10/2000 | Meinerth et al. | |
| 6,198,624 B1 | * | 3/2001 | Margaritis | 361/679.05 |
| 6,233,138 B1 | * | 5/2001 | Osgood | 361/679.05 |
| 6,278,428 B1 | | 8/2001 | Smith et al. | |
| 6,295,038 B1 | | 9/2001 | Rebeske | |
| 6,311,141 B1 | | 10/2001 | Hazra | |
| 6,326,723 B1 | | 12/2001 | Raj et al. | |
| 6,329,967 B1 | | 12/2001 | Little et al. | |
| 6,388,372 B2 | | 5/2002 | Raj et al. | |
| 6,464,195 B1 | | 10/2002 | Hildebrandt | |
| 6,507,350 B1 | | 1/2003 | Wilson | |
| 6,532,149 B2 | | 3/2003 | Dhar et al. | |
| 6,617,177 B1 | | 9/2003 | Winer | |
| 6,636,426 B2 | | 10/2003 | Inman | |
| 6,639,572 B1 | | 10/2003 | Little et al. | |
| 6,642,915 B1 | | 11/2003 | Booth, Jr. et al. | |

(Continued)

OTHER PUBLICATIONS

"42P20345_NALL_Mailed Mar. 23, 2007 for U.S. Appl. No. 10/957,020", Whole document.

(Continued)

*Primary Examiner*—Lisa Lea-Edmonds
(74) *Attorney, Agent, or Firm*—Blakely, Sokoloff, Taylor & Zafman LLP

(57) ABSTRACT

Portable computers include a display unit and a base unit. The base unit often includes a keyboard and a touch-sensing device. The position of the display unit relative to the base unit can be adjusted. In one embodiment, a track and support bar is used to vary the display unit's height. In another embodiment, a collapsible support bar is used to vary the display unit's height. In another embodiment, a ball-and-socket joint is used to pivot the display unit. In another embodiment, a retractable touch-sensing device is attached to the base unit.

14 Claims, 11 Drawing Sheets

U.S. PATENT DOCUMENTS

| | | |
|---|---|---|
| 6,809,470 B2 | 10/2004 | Morley et al. |
| 6,822,389 B2 | 11/2004 | Kwasnick et al. |
| 6,827,409 B2 * | 12/2004 | Michael .................. 312/223.3 |
| 6,839,049 B1 | 1/2005 | Koizumi |
| 6,867,540 B2 | 3/2005 | Morley et al. |
| 6,873,401 B2 | 5/2005 | Kozhukh |
| 6,956,542 B2 | 10/2005 | Okuley et al. |
| 6,961,046 B2 | 11/2005 | Bowden, III et al. |
| 6,995,771 B2 | 2/2006 | Willis et al. |
| 7,036,025 B2 | 4/2006 | Hunter |
| 7,042,436 B2 | 5/2006 | Rossi |
| 7,126,588 B2 | 10/2006 | Oakley |
| 7,251,128 B2 * | 7/2007 | Williams et al. ............ 361/683 |
| 2002/0044411 A1 | 4/2002 | Iredale |
| 2004/0125549 A1 * | 7/2004 | Iredale ....................... 361/681 |
| 2004/0228077 A1 | 11/2004 | Hall et al. |
| 2005/0063145 A1 * | 3/2005 | Homer et al. ............... 361/683 |
| 2005/0168499 A1 | 8/2005 | Williams et al. |
| 2005/0168926 A1 | 8/2005 | Lee et al. |
| 2005/0231900 A1 * | 10/2005 | Homer ....................... 361/683 |

OTHER PUBLICATIONS

USPTO, "42P20345_OA_Mailed Sep. 12, 2006 for U.S. Appl. No. 10/957,020", Whole document.

* cited by examiner

ADJUSTABLE PORTABLE COMPUTER

RELATED APPLICATIONS

This Application is a Divisional of application Ser. No. 10/957,020, filed on Sep. 30, 2004 and claims the benefit of that application, which will be issuing as U.S. Pat. No. 7,251,128 on Jul. 31, 2007.

FIELD

The field of invention relates generally to portable computing devices; and, more specifically, to a method and apparatus to increase a device's ergonomic arrangement.

BACKGROUND

This invention relates generally to portable computers, sometimes called laptop computers or notebook computers. Portable computers have become increasingly popular because of their mobility. In addition, due to the portable computer's small size, yet powerful computing capabilities, many users also use portable computers in place of stationary, or tower, computers.

Ergonomics, a branch of engineering that analyzes how people work with their tools, furniture and equipment, teaches that the traditional portable computer tends to cause users physical discomfort, such as muscle fatigue. To be ergonomically arranged, a computer should not require users to bend their necks to view the display. Additionally, the computer's keyboard should be located at approximately elbow height. Therefore, a traditional laptop is inherently problematic ergonomically because the height of the display over the keyboard is fixed.

U.S. Pat. No. 6,198,624 to Margaritis presented one solution to this problem in disclosing an extendable tube attached to the display unit and the keyboard unit. However, to provide the display unit with power and a video signal, a flexible cable was attached to the outside of the display unit. This arrangement is not only cumbersome and unsightly, but also dangerous as the exposed and protruding cable may be accidentally pulled out of the unit.

U.S. Pat. No. 6,464,195 to Hildebrandt solves this problem by bundling wires inside an extendable support panel. Although this arrangement hides the electrical connectors, it requires clips and extra wiring within the support panel, which in turns requires a support panel with enough internal space to house the clips and extra wiring.

In addition, neither of these prior arts addresses other ergonomic disadvantages with traditional laptops. For example, neither permits users to swivel the display unit independent of the rest of the laptop. Furthermore, neither addresses the location of the touch-sensing device, e.g. a touchpad mouse. Traditional laptops place the touch-sensing device on the laptop keyboard unit adjacent to the space bar, approximately midway between the left and right sides of the unit. This location restricts the potential size of the touch-sensing area. In addition, hand and wrist muscles strain to position themselves on a touchpad in such location.

DETAILED DESCRIPTION

The invention provides ergonomic enhancements for portable computers. In one embodiment of the invention, a display support system permits adjustment of the display unit's vertical and horizontal position relative to the keyboard. In one embodiment, the display support system also permits the display unit to swivel independently of the rest of the portable computer. In another aspect of the invention, the device provides a more ergonomic touch pad mouse.

Figure 1:
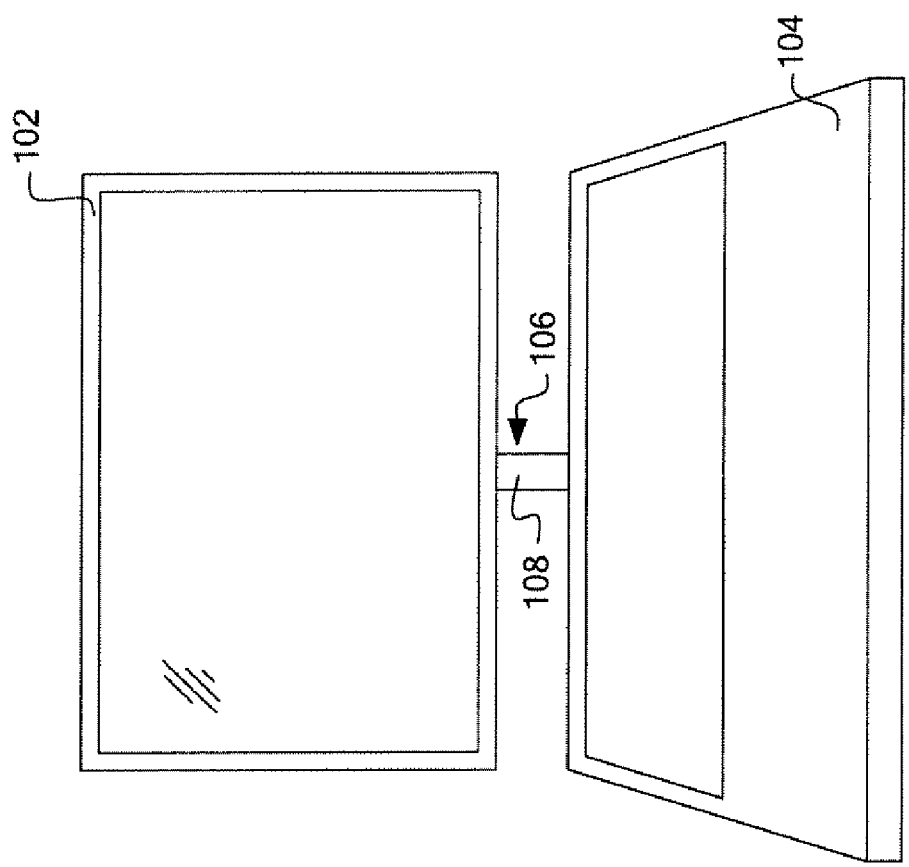
FIG. 1 is a front view of a portable computer featuring a display unit raised in accordance with one embodiment of the invention.
Figure 2:
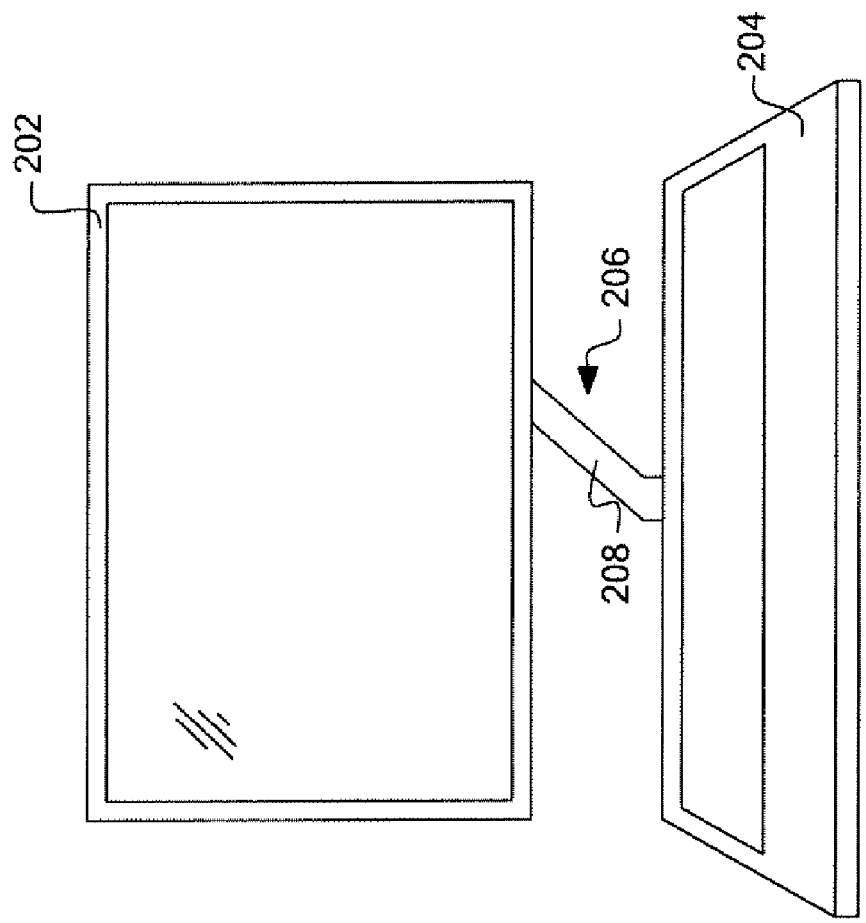
FIG. 2 is a front view of a portable computer featuring a display unit partially raised in accordance with one embodiment of the invention.

FIGS. 1 and 2 illustrate a front view of one embodiment of the invention. In FIG. 1, display unit 102 is raised above keyboard unit 104. Display support system 106 is fully extended so that the length of support bar 108 is ninety degrees (90°) relative to the base of keyboard unit 104. In FIG. 2, display support system 206 is partially extended so that the length of support bar 208 is angled at less than ninety degrees relative to the base of keyboard unit 204. Display support system 206 supports the weight of display unit 202 in all positions, from zero extension to partial extension to full extension.

In one embodiment, frictional forces support the display unit's position. The frictional forces exist in joints connecting support bar 208 with display unit 202 and connecting support bar 208 with keyboard unit 204. In another embodiment, locking mechanisms (not shown) are utilized to secure display unit 202 at a desirable height.

In one variation of the embodiment of FIGS. 1 and 2, the length of the support bar is approximately the width of the keyboard unit, such that the bar extends essentially the width of the keyboard unit when the display unit is not raised. That is, one end of the support bar is attached to the keyboard unit near one side, such as the left side, and the other end of the support bar is attached to the display unit near the opposite side, such as the right side. In this embodiment, the display unit can be raised to a height of approximately the keyboard unit's width. A system that requires the display unit to rise less than the width of the keyboard unit may use a smaller length support bar.

Figure 3:
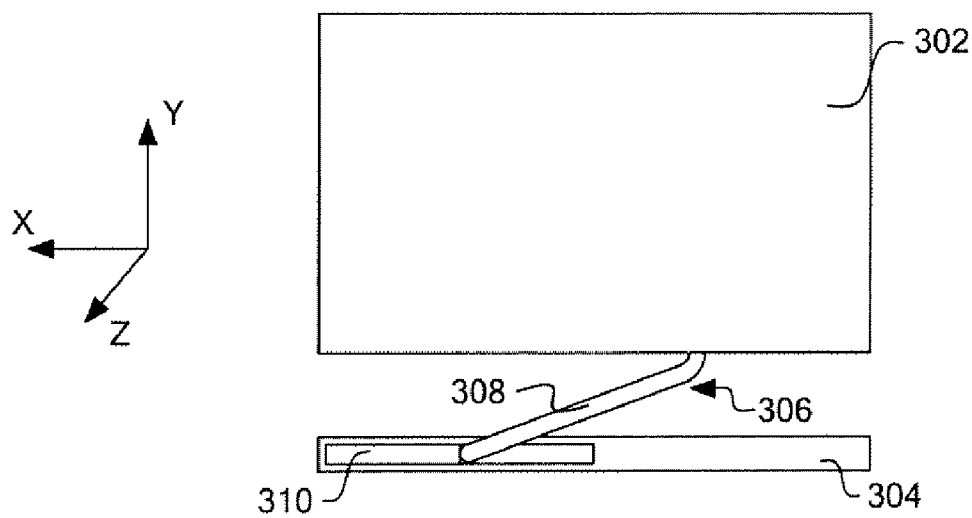
FIG. 3 is a back view of a portable computer featuring a display unit partially raised in accordance with one embodiment of the invention.

FIG. 3 illustrates a back view of the embodiment of FIG. 2. Track 310 is attached to keyboard unit 304. Support rod 308 connects to track 310, allowing support rod 308 to move horizontally relative to the track. This horizontal movement permits support system 306 to raise and lower display unit 302 without retracting parts of support rod 308 into either itself or the display unit. When display unit 302 is not raised, support bar 308 rests behind keyboard unit 304.

Figure 4A:
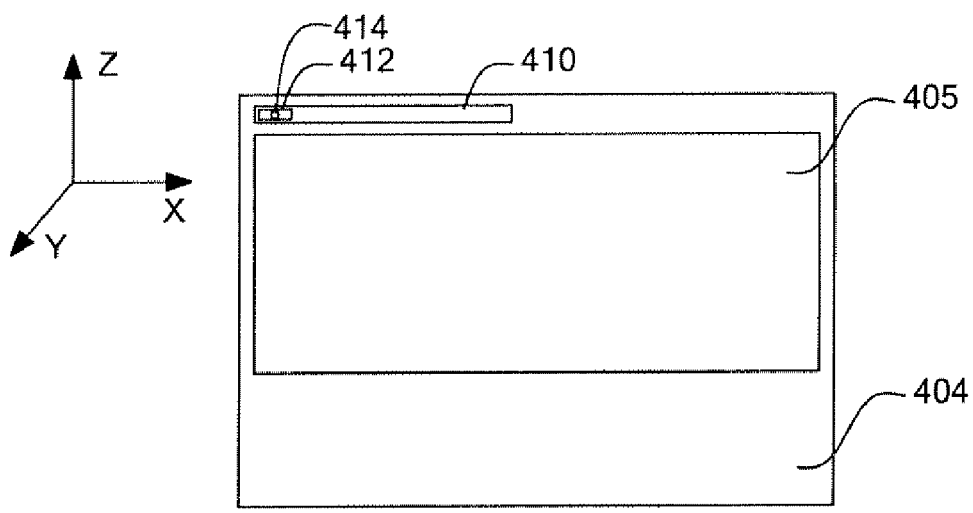
FIG. 4a is a top view of the keyboard unit of a portable computer in accordance with one embodiment of the invention.
Figure 4B:
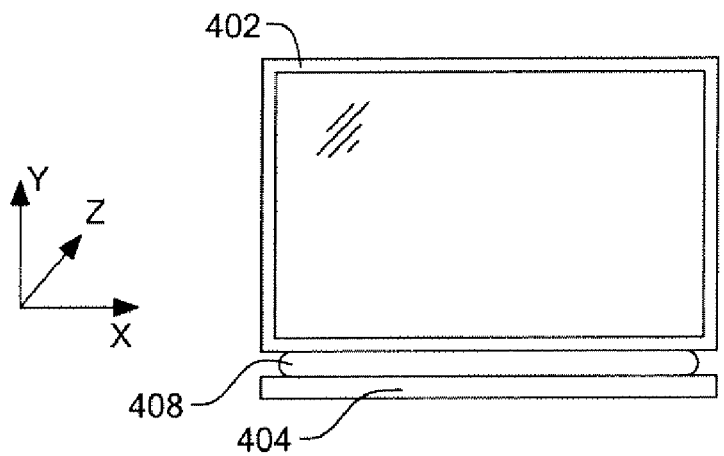
FIG. 4b is a front view of a portable computer in accordance with one embodiment of the invention.

In another embodiment, the track is attached to the top surface of the keyboard unit, rather than the back surface. FIG. 4a is a top view of this type of configuration. Track 410 and keyboard 405 are coplanar. FIG. 4b is a front view of this same type of configuration when display unit 402 is not raised. Because track 410 is coplanar with keyboard 405, when display unit 402 is not raised, display unit 402 rests above support rod 408, which rests above keyboard unit 404. In this embodiment, support rod 408 need not bend or curve to attach to track 410. Support rod 408 connects to joint 414, which connects to slider 412, which slides laterally along track 410.

Figure 5:
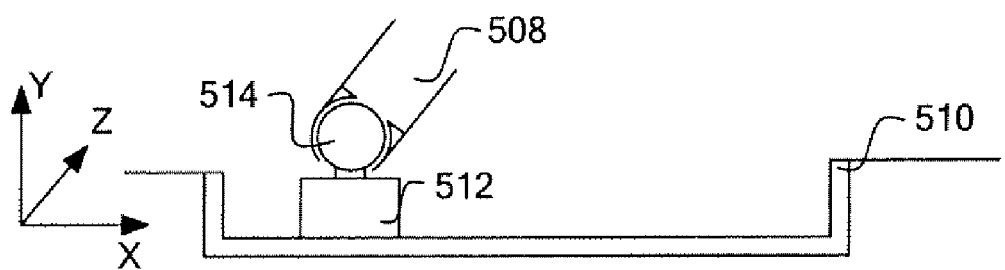
FIG. 5 is a cross-sectional view of a track and ball-and-socket joint used in one embodiment of the invention.
Figure 6:
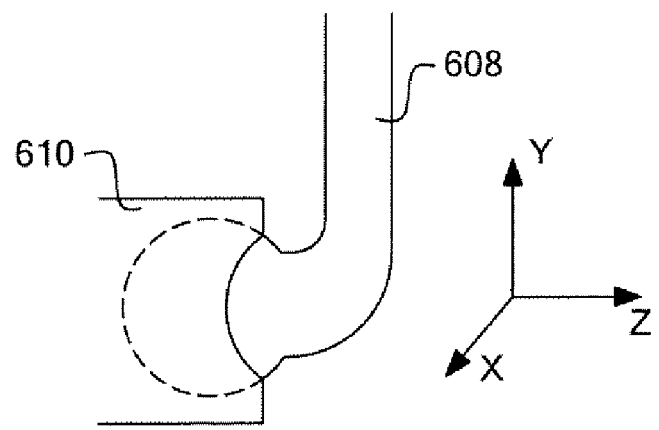
FIG. 6 is a cross-sectional view of an alternative joint used in one embodiment of the invention.
Figure 7:
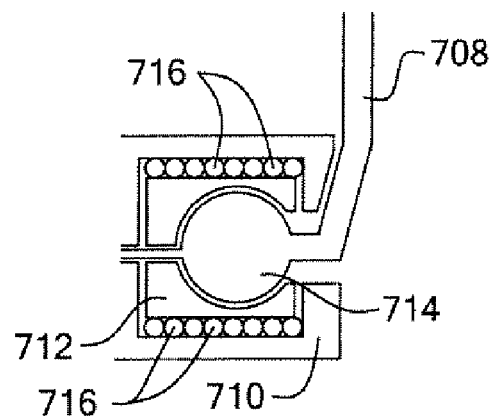
FIG. 7 is a cross-sectional view of another alternative joint used in one embodiment of the invention.

Support rod 308, 408 connects to track 310, 410 using joints. In one embodiment, support rod 308, 408 connects to track 310, 410 through a ball and socket joint. FIG. 5 shows a cross-sectional view of one possible ball-and-socket joint connection. In FIG. 5, support rod 508 ends in a socket. Ball 514 fits into the socket. The ball-and-socket joint attaches to slider 512, which slides laterally along track 510 when necessary. FIG. 6 shows a cross-sectional view of an alternative ball and socket joint connection. In FIG. 6, support rod 608 ends in a spherical shape. Track 610 has an inner surface curved like the inner surface of a cylinder, so that the support rod's spherical end fits into track 610. FIG. 7 is a cross-sectional view of yet another alternative ball and socket joint connection. In FIG. 7, support rod 708 connects to a commercially available ball and socket connector (shown here as 712, 714). The ball and socket connector fits into track 710. Ball bearings 716 are utilized to permit connector 712, 714 to slide laterally along track 710. The invention is not limited to the shape and configuration of the ball and socket connector shown in FIGS. 5, 6 and 7. Various connectors that provides the ball and socket connection of this embodiment may be utilized.

In FIG. 3, support rod 308 also connects to a track (not shown) attached to display unit 302. A ball and socket joint at this connection permits display unit 302 to pivot around the y-axis. This allows display unit 302 to swivel for easier viewing by nearby users without swiveling keyboard unit 304. Like the connection between the support rod and a track attached to the keyboard unit, the connection between the support rod and a track attached to display unit can be formed with any joint that permits the rod to move laterally along the track and to pivot around the z-axis.

Figure 8:
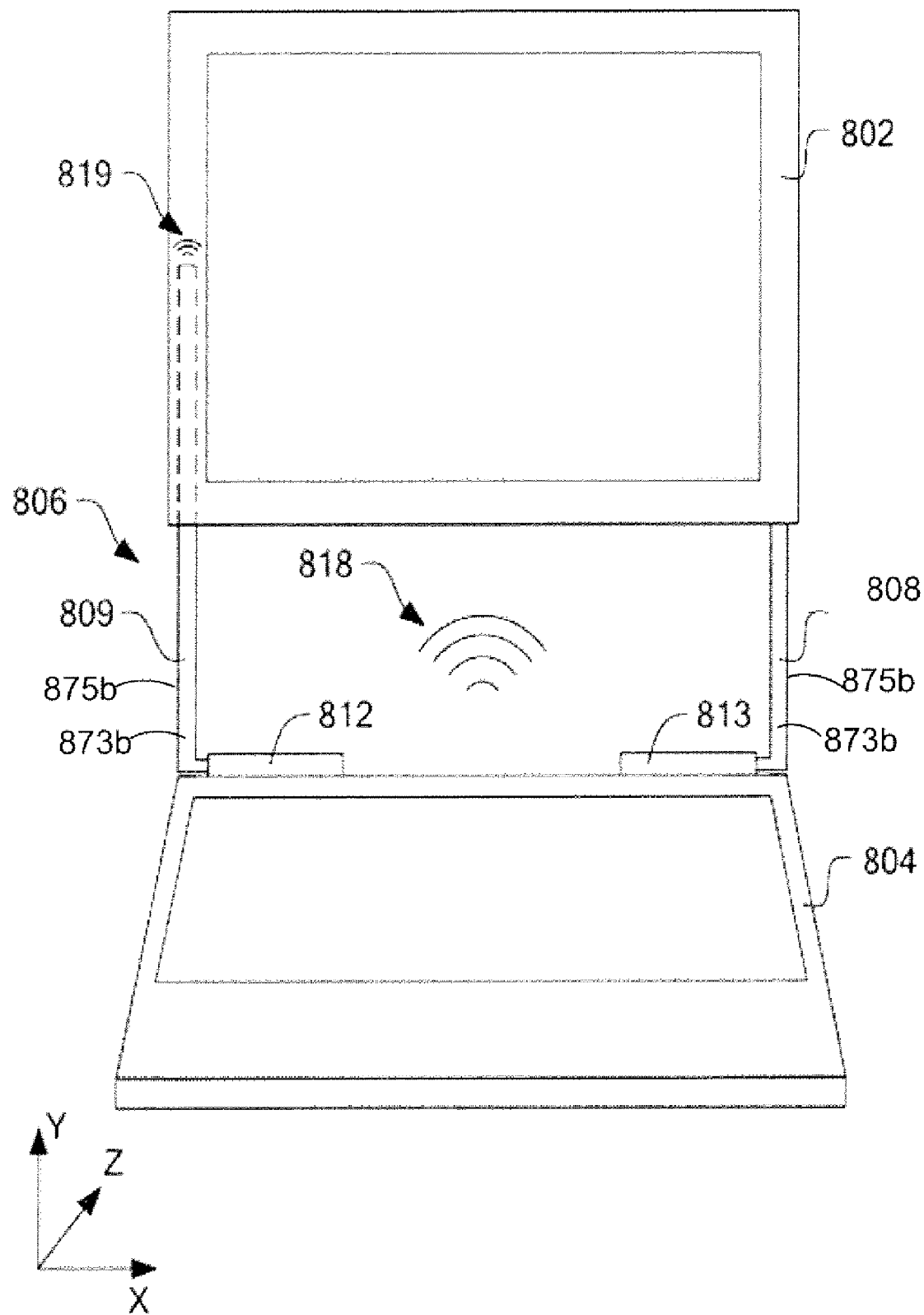
FIG. 8 is a front view of a portable computer featuring a display unit raised in accordance with an alternative embodiment of the invention.
Figure 9:
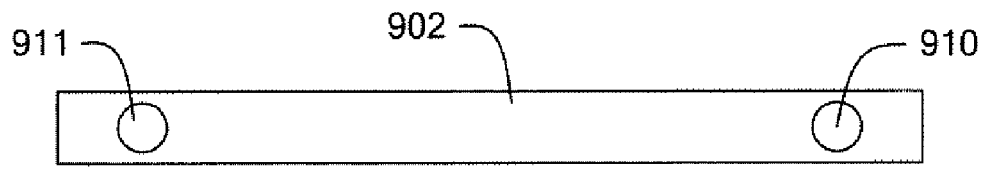
FIG. 9 is a bottom view of a display unit in accordance with an embodiment of the invention using a two-rod support system.
Figure 10:
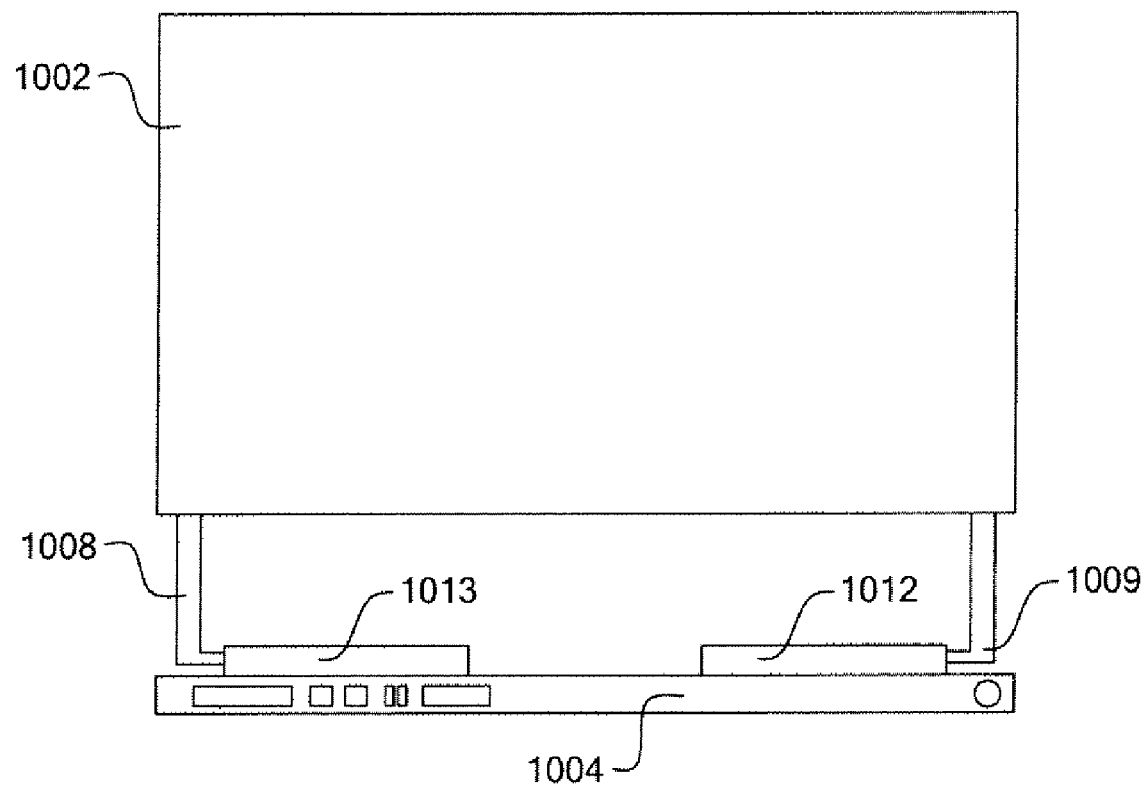
FIG. 10 is a back view of a portable computer featuring a display unit partially raised in accordance with an alternative embodiment of the invention.

FIG. 8 illustrates another embodiment of the support system. In this embodiment more than one rod 808, 809 is utilized in support system 806. FIG. 9 provides a bottom view of the display unit in FIG. 8. Two channels 910, 911 are formed within display unit 902. Although FIG. 9 shows channels 910, 911 having a circular cross-sectional shape, they need not be circular. Channels 910, 911 may have any cross-sectional shape appropriate to fit the cross-section shape of rods 808, 809. Channels 910, 911 are disposed within display unit 902, such that the display unit housing covers portions of rods 808, 809 inside channels 910, 911. FIG. 8 uses dotted lines to show the portion of rod 809 inside display unit 802. FIG. 10 shows a back view of the embodiment of FIG. 8. Display unit 1002 hides portions of rods 1008, 1009 that are disposed within the channels.

Figure 11:
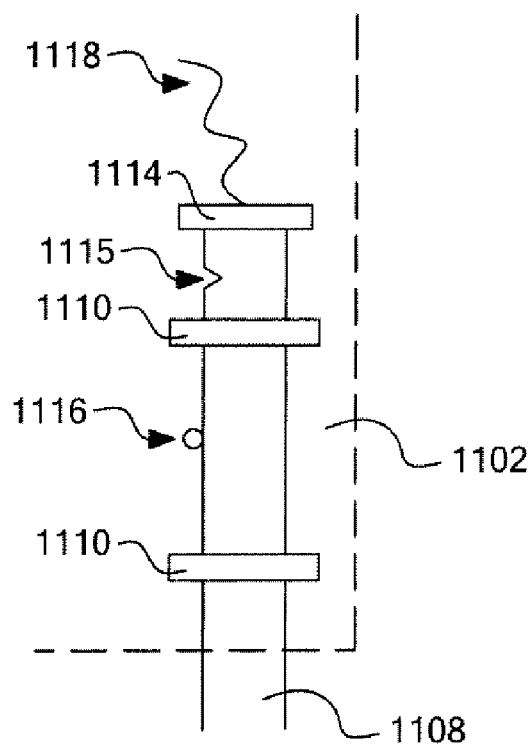
FIG. 11 is a cross-sectional view of a portion of a support system inside a portable computer display unit in accordance with one embodiment of the invention.

Frictional forces may be relied upon to fix the display unit firmly in place when raised. Alternatively, locking mechanisms may be utilized. FIG. 11 shows one embodiment of a locking mechanism in accordance with the invention. In FIG. 11, spring clip 1116 secures rod 1108 at a desired location in display unit 1102. Although only one spring clip is shown, more than one spring clip may be used. Spring clip 1116 locks rod 1108 in place when clip 1116 sits within groove 1115. Although only one groove is shown, the rod may have more than one groove, depending on how many locked positions are desired. Other locking mechanisms may also be used.

The embodiment shown in FIG. 11 also shows guides 1110 for rod 1108. Such additional support may be used depending on the diameter of the channel relative to the diameter of the rod. FIG. 11 also shows rod 1108 ending in stop 1114. Stop 1114 prevents rod 1108 from detaching completely from display unit 1102. Stop 1114 may be an independent cap attached to rod 1108. Alternatively, stop 1114 may be formed as a wider part of rod 1108.

Figure 12:
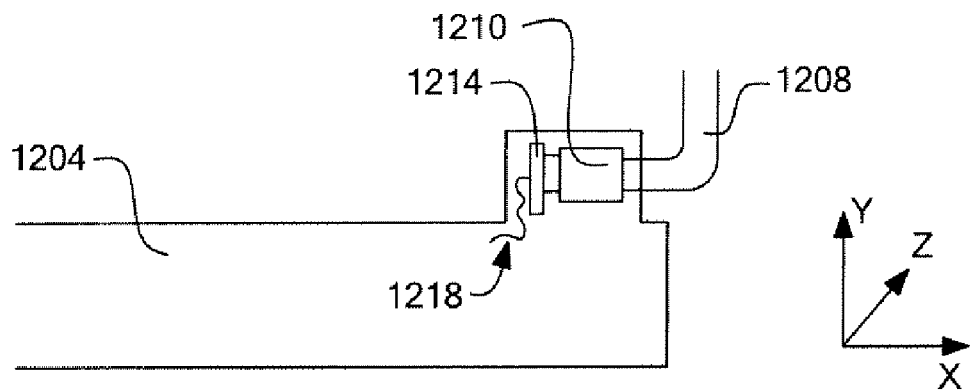
FIG. 12 is a cross-sectional view of a portion of a support system inside a portable computer keyboard unit in accordance with one embodiment of the invention.

FIG. 8 also shows rods 808, 809 fitting into hinges 812, 813 attached to keyboard unit 804. As in traditional laptops, hinges 812, 813 permit display unit 802 to pivot around the x-axis. FIG. 12 shows a cross-section of one hinge used in accordance with one embodiment of this invention. Rod 1208 bends into hinge 1210, which is disposed inside keyboard unit 1204. Rod 1208 ends in stop 1214, which prevents rod 1208 from detaching from hinge 1210. Stop 1214 may be an independent cap attached to rod 1208. Alternatively, stop 1214 may be formed as a wider part of rod 1208.

In one embodiment, the length of rods 808, 809 depends partially on the mass of keyboard unit 804. A keyboard unit that is more massive than its corresponding display unit will permit the display unit to be raised higher without tipping the entire device. In such units, longer rods may be utilized since a more massive keyboard unit will maintain the center of mass of the entire unit in a location that will permit the keyboard unit to sit firmly even while the display unit is extended vertically along the y-axis and pivoted around the x-axis.

In one embodiment, one or both rods 808, 809 are hollow to permit cables carrying power and/or video signal to travel to display unit 802. In one embodiment, rods 808, 809 comprises of denser material to provide more structural support than would otherwise be required if the rods were solid. In one embodiment, additional wire may be used to permit the display unit to maintain electrical connection to the keyboard unit while extended. When the display unit is less than fully extended, the additional wire gathers inside the display unit rather than the hollow support bars. This configuration permits a support bar housing the cables to have a smaller cross-sectional area than would be required than if the bar was also required to hold additional wiring.

In another embodiment, additional wires would not be required. Instead, wires carry the signal to the top of the rod, and then electrically connect to an antenna. The antenna transmits video signal 819 to an antenna within the display unit. The signal induces an alternating current in the latter antenna. Alternatively, a separate signal may be transmitted to induce an alternating current in the latter antenna. The current is then rectified as necessary and used to power electrical components in the display unit. Having the transmitting antenna located within a portion of the support system inside the display unit decreases the distance from the transmitting antenna to the receiving antenna, thereby increasing the strength of the signal actually received by the display unit's antenna. Alternatively, the transmitting antenna may be disposed on the keyboard unit so that the rods need not carry any signals. In another embodiment, both antennas both transmit and receive signals.

In yet another embodiment, one or both rods 808, 809 have a solid conductive core 873b surrounded by an insulating material 875b. This core electrically connects keyboard unit 804 and display unit 802. In this embodiment, rods 808, 809 become part of the electrical connection, rather than merely housing for the electrical connectors. Power and/or video signals travel along this conductive core. The rods may connect to wires 1118, as shown in FIG. 11, which gather within the display unit when the unit is not fully extended. Alternatively, the rods may end in an antenna, as shown in FIG. 8, that transmits signals 819 to a receiving antenna within the display unit. In another embodiment, both antennas both transmit and receive signals.

Figure 13:
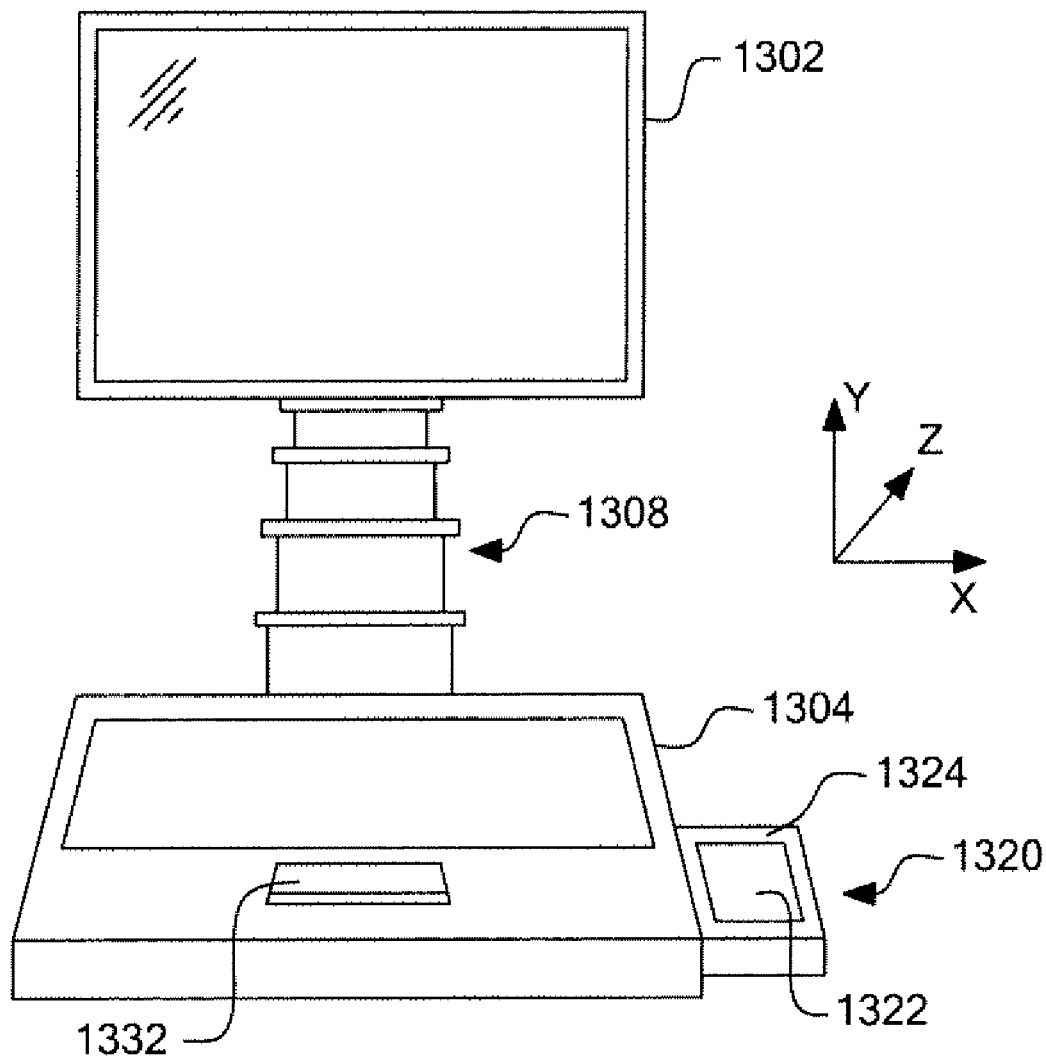
FIG. 13 is a front view of a portable computer featuring a display unit raised in accordance with an alternative embodiment of the invention.

FIG. 13 illustrates yet another embodiment of the invention. Here, support rod 1308 comprises of several linking sections, which collapse into each other as display unit 1302 is positioned closer to keyboard unit 1304. In one embodiment, the lower sections have slightly larger dimensions than sections located above it. This permits upper sections to fit within lower sections when the support is not extended. In one embodiment, the sections are held in place by friction. Alternatively, locking mechanisms (not shown) may be utilized.

Figure 14:
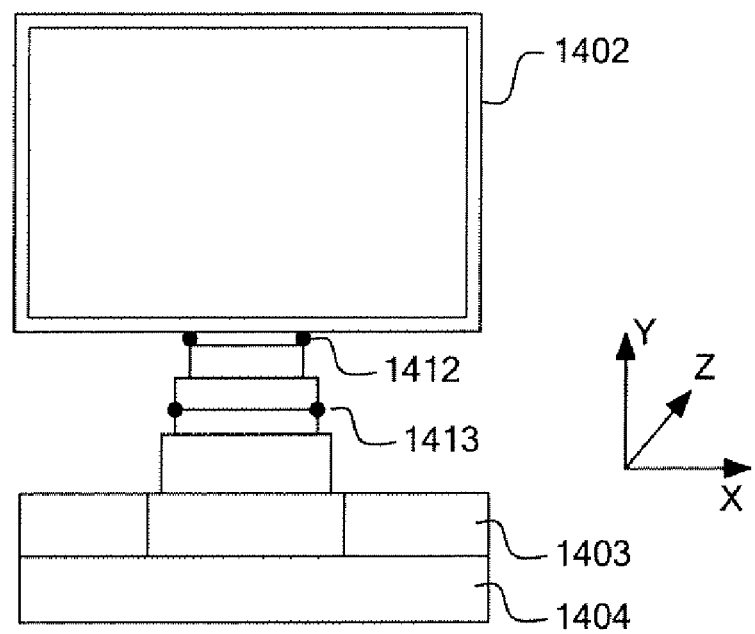
FIG. 14 is a front cross-sectional view of a portable computer featuring a display unit raised in accordance with an alternative embodiment of the invention.
Figure 15:
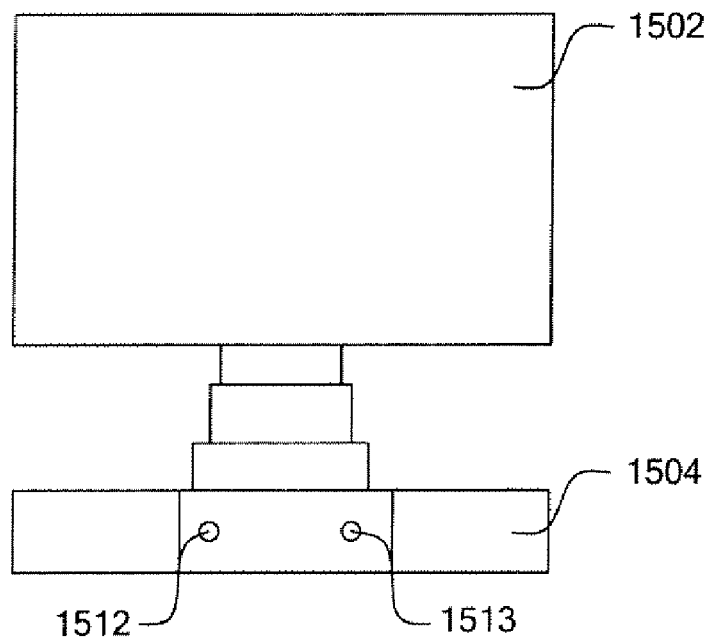
FIG. 15 is a front cross-sectional view of a portable computer featuring a display unit raised in accordance with another alternative embodiment of the invention.

Each section's height is such that when fully collapsed, the section does not interfere with closing display unit 1302 onto keyboard unit 1304. FIG. 14 shows an embodiment in which support sections collapse into a storage space 1403 disposed within display unit 1404. FIG. 15 shows an alternative embodiment, in which the lowest support section is attached to the back of display unit 1504 with screws 1512, 1513. Support sections above the lowest support section collapse into the lowest support section. The lowest support section may attach to display unit 1504 using various methods of attachment, including but not limited to screws, adhesive and bolts.

Figure 16:
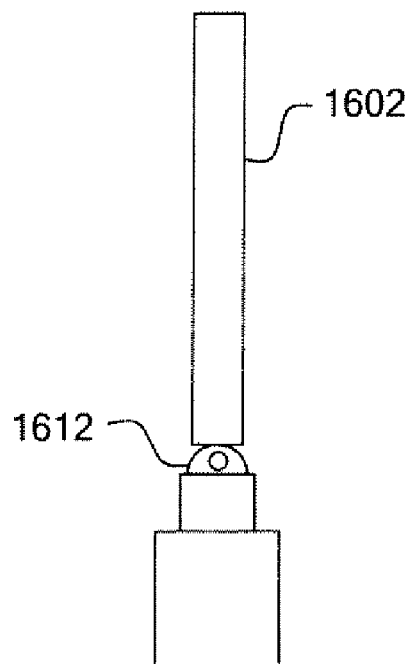
FIG. 16 is a side view of a portable computer featuring a display unit raised in accordance with an alternative embodiment of the invention.
Figure 17:
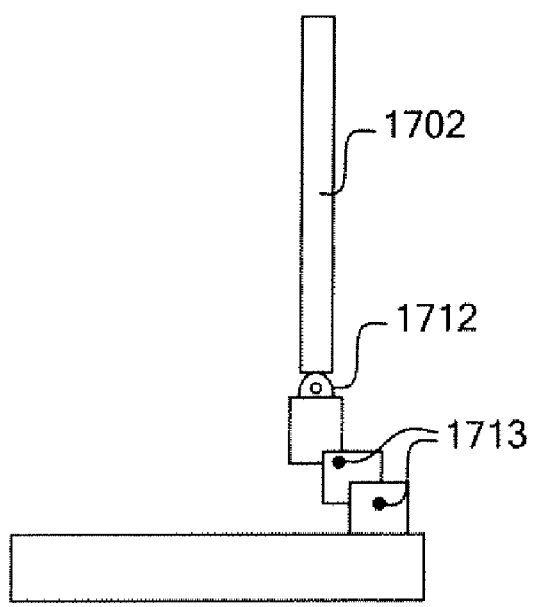
FIG. 17 is a back view of a portable computer featuring a display unit raised in accordance with an alternative embodiment of the invention.

In one embodiment, the top support section attaches to the display unit using a hinge. FIG. 16 is a side view of one such embodiment. The top support section attaches to display unit 1602 using hinge 1612. Alternatively, the top support section may attach to display unit 1602 through a ball-and-socket joint that allows display unit 1602 to pivot. In one embodiment, other support sections also include a hinge, as shown in FIG. 14. In FIG. 14, hinge 1413 is disposed in a lower support section, in addition to hinge 1412, which connects the top support section to display unit 1402. Hinge 1413 permits the forward adjustment of the display unit 1402. FIG. 17 is a side view of a display adjusted forward using hinges in lower support sections. In FIG. 17, hinge 1712 attaches the top support section to display unit 1702. Hinges 1713 permit display unit 1702 to adjust forward.

Figure 18:
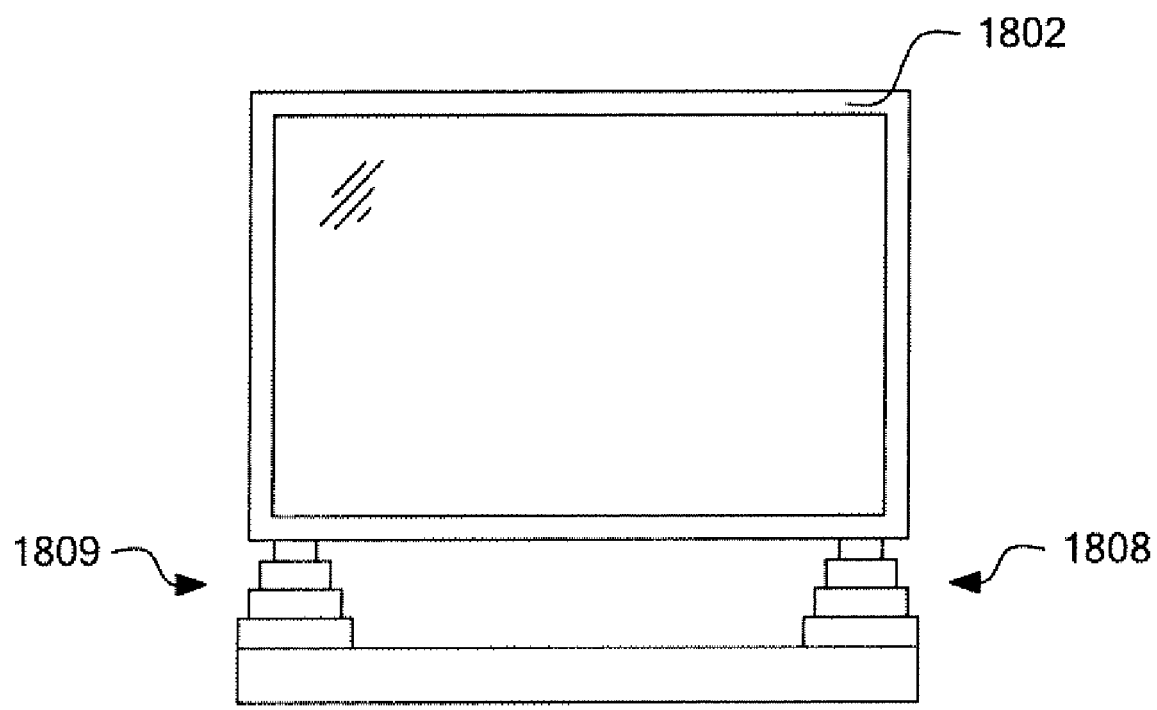
FIG. 18 is a side view of a portable computer featuring a display unit adjusted in accordance with an alternative embodiment of the invention.

In another embodiment, more than one collapsible rod is used to support the display unit. FIG. 18 is a cross-sectional front view of one such embodiment. Collapsible support rods 1808, 1809 support display unit 1802. Wires may be used to carry signals to display unit 1802. Extraneous wiring may be housed inside the display unit to allow for smaller support sections. Alternatively, the signals may be transmitted wireless, as detailed below.

Additionally, the embodiment shown in FIG. 13 comprises a touchpad mouse 1320. Touchpad mouse 1320 may be the primary touch-sensing device on the laptop or in addition to a traditionally located touchpad mouse 1332. The sensing component (or touchpad) 1322 of touchpad mouse 1320 is located on pad housing unit 1324. Pad housing unit 1324 is retractable into keyboard unit 1304. This retraction may be performed manually or through use of motors, including but not limited to motors used to mobilize CD-ROM drive units. When not retracted, pad housing unit 1324 is located lateral to keyboard unit 1304.

In any of the above embodiments, the video signal for the display unit may be carried using the same electrical connections carrying the power signal to the display unit. For example, in embodiments where power is delivered to the display unit via cables, the video signal may be carried as an additional signal on top of the power signal, with both signals traveling on the same cable. If power is delivered via an electrically conductive rigid rod, then the video signal may be delivered in a signal carried along that same rod.

Alternatively, the video signal may be carried on a separate electrical connector. For example, in embodiments where power is delivered via flexible cables, a separate cable may be utilized to carry the video signal. In one variation of embodiments where an electrically conductive rod provides the electrical connection, an insulating material (e.g. plastic or other dielectric) may surround the rod. Another conductive material (e.g. copper) would then surround the insulating material. This conductive material is surrounded by another insulating material. One conductor carries the power signal while the other carries the video signal. In embodiments where two rods are utilized in the support system, one rod may be used to carry the power signal while the other rod is used to carry the video signal.

Alternatively, the solid core may be comprised of material capable of transporting light such as glass or plastic fiber optics. The core is insulated as necessary and then surrounded by a conductor, which is then surrounded by an insulator. In this embodiment, the core carries the video signal, while the conductor would carry the power signal.

Alternatively, the video signal may be transmitted to the display unit wirelessly, such as through infrared (IR) or radio frequency (RF) communications. For example, Bluetooth technology may be used to provide a low power wireless link using radio frequency communications. High-bandwidth variations are also within the scope of this invention. FIG. 6 illustrates such wireless communication. In such embodiments, both display unit 604 and keyboard unit 602 have antennas (not shown) to transmit and/or receive wireless signals 618.

The display unit may also be powered wirelessly as previously mentioned. In such embodiments, the display unit would comprise of an antenna that receives signals from the keyboard unit. The transmitting antenna may be located anywhere on or in the device. The signal induces an alternating current in the antenna, which is then rectified as necessary for use by electrical components in the display unit.

While the present invention has been described with respect to a limited number of embodiments, those skilled in the art will appreciate numerous modifications and variations therefrom.

What is claimed is:

1. A portable device having an adjustment for a display's vertical position relative to a keyboard, comprising:
a first housing having the keyboard;
a first rod connected to the first housing;
a second rod connected to the first housing; and
a second housing having the display, the second housing including a first channel into the second housing for insertion of the first rod and a second channel into the second housing for insertion of the second rod;
wherein the first rod and the second rod are moveable within the first and second channels to adjust a vertical position of the second housing having the display relative to the keyboard, the first rod including a stop at a first end of the first rod, the stop to prevent the first rod from detaching from the second housing.

2. The device of claim 1 wherein first rod is hollow and wherein a conductor is disposed within the first rod, the conductor to connect electrically the first housing and the second housing.

3. The device of claim 1 further comprising a first antenna and a second antenna, and wherein the display contained in the second housing is to receive via the second antenna at least a wireless video signal or a wireless power signal transmitted from the first housing via the first antenna.

4. The device of claim 3 wherein the first antenna is contained inside the first rod.

5. The device of claim 1, wherein the first housing includes a locking mechanism in the first channel to lock the first rod in a first position.

6. The device of claim 5, wherein the locking mechanism includes a first spring clip and the first rod includes a first notch, the first spring clip to lock the first rod into a first position when the first spring clip rests in the first notch.

7. The device of claim 6, wherein the second housing includes a second locking mechanism, the second locking mechanism including a second spring clip and the second rod including a second notch, the second spring clip to lock the second rod into the first position when the second spring clip rests in the second notch.

8. The device of claim 6, wherein the first rod includes a plurality of notches, the first spring clip to lock the first rod into a plurality of positions, each of plurality of positions being locked when the first spring clip rests in one of the plurality of notches.

9. The device of claim 1, wherein the first channel or the second channel include one or more guides to support the first rod or the second rod in the first or second channel.

10. The device of claim 1, wherein the first housing includes a first hinge and a second hinge, and wherein the first rod is connected to the first housing via the first hinge and the second rod is connected to the first housing via the second hinge.

11. The device of claim 10, wherein the second housing may be pivoted around the first and second hinges to adjust an angle of the display relative to the keyboard.

12. A portable device having an adjustment for a display's vertical position relative to a keyboard, comprising:
a first housing having the keyboard;
a first rod connected to the first housing;
a second rod connected to the first housing; and
a second housing having the display, the second housing including a first channel into the second housing for insertion of the first rod and a second channel into the second housing for insertion of the second rod;
wherein the first rod and the second rod are moveable within the first and second channels to adjust a vertical position of the second housing having the display relative to the keyboard, and wherein the first rod includes an outside insulator and an inside conductive core.

13. The device of claim 12, wherein power or video signals are conducted from the first housing to the second housing via the conductive core of the first rod.

14. The device of claim 13, wherein an end of the first rod is coupled with a wire to conduct the power or video signals to the second housing, the wire to gather inside the second housing when the first rod is less than fully extended in the first channel.

* * * * *